United States Patent [19]

Schmitt

[11] Patent Number: 4,941,906
[45] Date of Patent: * Jul. 17, 1990

[54] BALANCED MOLDING OF OPTICAL ELEMENTS

[75] Inventor: Paul S. Schmitt, Corning, N.Y.

[73] Assignee: Corning Incorporated, Corning, N.Y.

[*] Notice: The portion of the term of this patent subsequent to Sep. 29, 2004 has been disclaimed.

[21] Appl. No.: 331,821

[22] Filed: Apr. 3, 1989

Related U.S. Application Data

[63] Continuation of Ser. No. 71,405, Jul. 9, 1987, abandoned.

[51] Int. Cl.$^5$ .................. C03B 29/00; C03B 23/00
[52] U.S. Cl. ................................... 65/29; 65/64; 65/102; 65/111; 65/275
[58] Field of Search ............... 65/37, 39, 54, 64, 102, 65/111, 168, 275, 287, 292, 104, 106, 29

[56] References Cited

U.S. PATENT DOCUMENTS

| | | | |
|---|---|---|---|
| 3,874,777 | 4/1975 | Deeg et al. | 65/39 |
| 4,435,200 | 3/1984 | Joorman et al. | 65/64 |
| 4,481,023 | 11/1984 | Marechal et al. | 65/64 |
| 4,591,373 | 5/1986 | Sato | 65/102 |
| 4,629,487 | 12/1986 | Monji et al. | 65/37 |
| 4,629,489 | 12/1986 | Hirota et al. | 65/76 |
| 4,696,692 | 9/1987 | Schmitt | 65/102 |

*Primary Examiner*—Kenneth M. Schor
*Attorney, Agent, or Firm*—Alfred L. Michaelsen

[57] ABSTRACT

Glass optical elements are molded by moving molds toward one another to press the glass and controlling the movement of the molds to balance the complete formation of the molded surfaces. A first mold is moved to a position short of contact with the glass and parked. A second mold is moved into contact with the glass to drive the glass into contact with the molding surface of the first mold. This changes the shape of the optical surface in contact with the second mold so that continued movement of the first and second molds results in balanced molding with the voids between the molding surfaces and the glass being equivalent for both surfaces.

19 Claims, 11 Drawing Sheets

MAXIMUM VOLUME

MINIMUM VOLUME

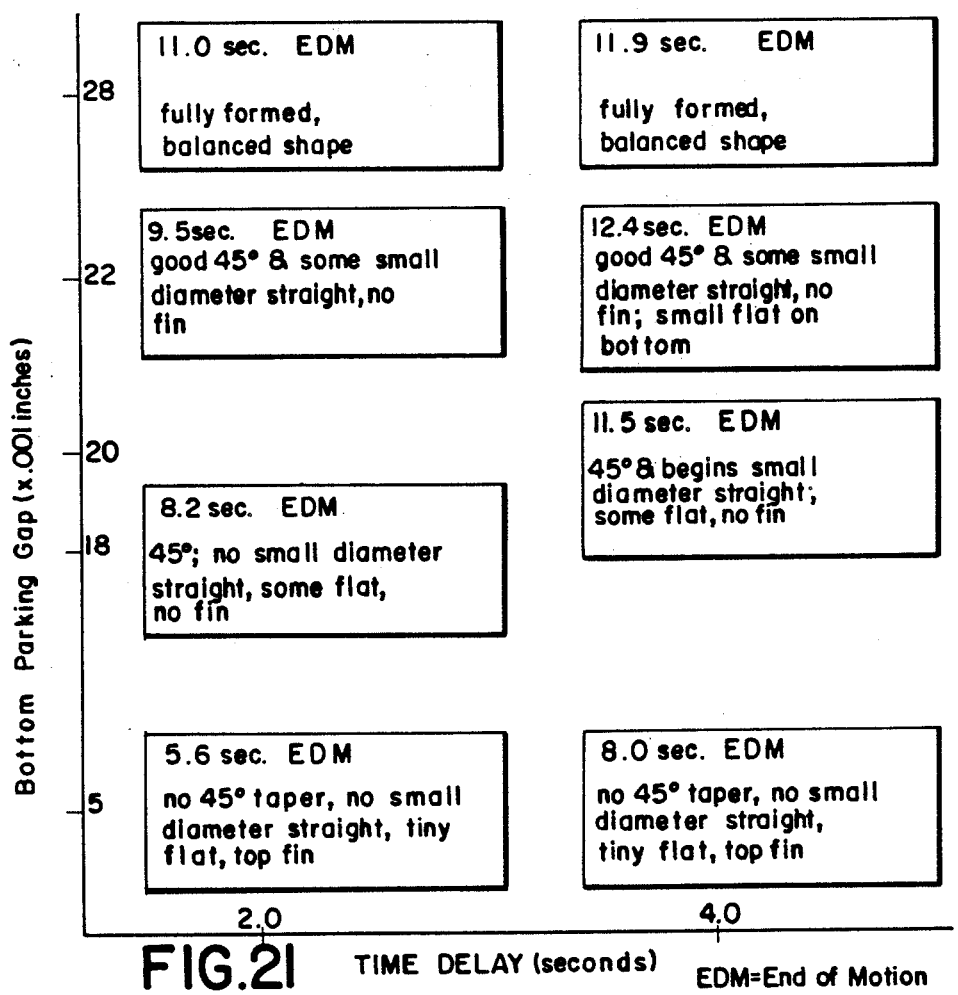
FIG.21 TIME DELAY (seconds)  EDM=End of Motion
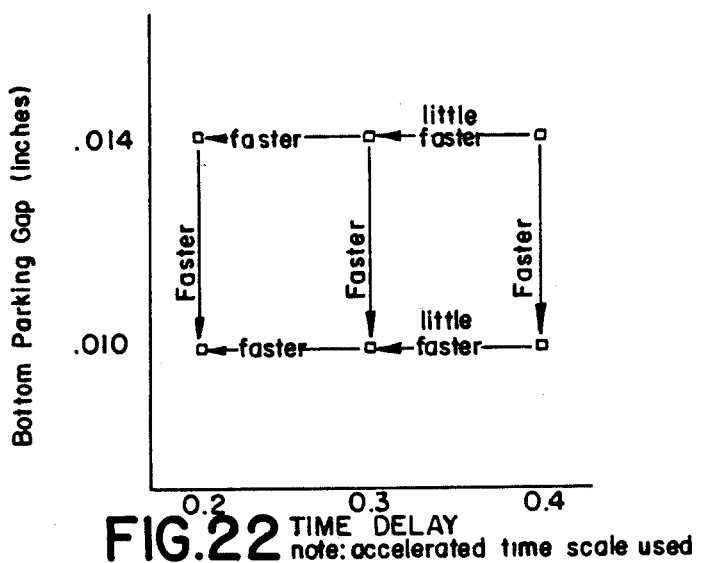
FIG.22 TIME DELAY
note: accelerated time scale used

BALANCED MOLDING OF OPTICAL ELEMENTS

This application is a continuation of application Ser. No. 07/071405 filed Jul. 9, 1987 and now abandoned.

BACKGROUND OF THE INVENTION

Precision optical elements require highly polished surfaces of exacting figure and surface quality. The surfaces demand fabrication in proper geometric relation to each other and, where the elements are to be used in transmission applications, they will be prepared from a material of controlled, uniform, and isotropic refractive index.

Precision optical elements of glass are customarily produced via one of two complex, multi-step processes. In the first, a glass batch is melted in a conventional manner and the melt formed into a glass body having a controlled and homogeneous refractive index. Thereafter, the body may be reformed utilizing well-known repressing techniques to yield a shape approximating the desired final article. The surface figure and finish of the body at this stage of production, however, are not adequate for image forming optics. The rough article is fine annealed to develop the proper refractive index and the surface figure improved via conventional grinding practices. In the second method the glass melt is formed into a bulk body which is immediately fine annealed and substantially cut and ground to articles of a desired configuration.

Both processes are subject to similar limitations. The surface profiles that are produced through grinding are normally restricted to conic sections, such as flats, spheres, and parabolas. Other shapes and, in particular, general aspheric surfaces are difficult to grind. In both processes, the ground optical surfaces are polished employing conventional, but complicated, polishing techniques which strive to improve surface finish without compromising the surface figure. In the case of aspheric surfaces, this polishing demands highly skilled and expensive hand working. A final finishing operation, viz., edging, is commonly required. Edging insures that the optical and mechanical axes of a spherical lens coincide. Edging, however, does not improve the relationship of misaligned aspheric surfaces, which factor accounts in part for the difficulty experienced in grinding such lenses.

The direct molding of lenses to the finished state could, in principle, eliminate the grinding, polishing, and edging operations, which are especially difficult and time consuming for aspheric lenses. Indeed, molding processes are utilized for fabricating plastic lenses. Nevertheless, existing plastics suitable for optical applications are available in a limited refractive index and dispersion range only. Furthermore, many plastics scratch easily and are prone to the development of yellowing, haze, and birefringence. The use of abrasion-resistant and anti-reflective coatings has not fully solved those failings. Moreover, plastic optical elements are subject to distortion from mechanical forces, humidity, and heat. Both the volume and refractive index of plastics vary substantially with changes in temperature, thereby limiting the temperature interval over which they are useful.

The overall properties of glass render it generally superior to plastic as an optical material. Conventional hot pressing of glass, however, does not provide the exacting surface figures and surface qualities demanded for image forming optics. The presence of chill wrinkles in the surface and surface figure deviations constitute chronic afflictions. As observed above, similar problems can be encountered in conventional repressing techniques.

Various schemes have been devised to correct those problems, such devices frequently involving isothermal pressing, i.e., utilizing heated molds so that the temperature of the glass being molded will be essentially the same as that of the molds, the use of gaseous environments inert to the glass and mold materials during the pressing operation, and/or the use of materials of specifically defined compositions in the construction of the molds.

U.S. Pat. No. 4,481,023-Marechal and Maschmeyer shows and describes an improved mold for precisely pressing a glass preform which has an overall geometry closely similar to the desired final lens. A top and a bottom mold have molding cavities which precisely match the configuration of the final lens. A glass preform is heated to the molding temperature and the mold parts are separately heated. The molds are brought together against a ring having a thickness which governs the thickness of the lens to be molded.

In such a molding operation, the molding of the two opposed optical surfaces should be balanced. Balanced molding of a lens means that the degree to which the glass fills the voids between each mold surface is equivalent. This is typically measured by the radii between each lens surface and the common side wall.

It is an object of the present invention to achieve balanced molding of lenses by using adjustments to the closing movement of the molds.

RELATED APPLICATIONS

"KINEMATICALLY DETERMINATE MOLD ASSEMBLY", Ser. No. 940,120 (U.S. Pat. No. 4696692), filed Dec. 10, 1986, Paul S. Schmitt, shows and claims a mold assembly which can be controlled in accordance with the present invention. The disclosure of that application is incorporated herein by reference.

SUMMARY OF THE INVENTION

In accordance with the present invention, the closing movement of two molds is adjusted to balance the completion of the formation of the optical surfaces of an optical element. Balanced molding is achieved wherein the degree to which the glass fills the voids between the mold surfaces is equivalent. Specifically, one mold is brought to a temporary parking position, while the other mold deforms the glass preform into a more balanced shape.

The present invention has the advantage that preforms with curved surfaces, which would otherwise produce unbalanced molding, can be molded so that the glass fills the voids between the mold surfaces equivalently. Preform shapes which would otherwise result in unbalanced molding can be molded in a balanced manner. This makes it possible to use less costly preforms. Also, the molding process can be speeded up by using the controlled closure variables of mold park position and time delay until the start of the movement of the parked mold.

The invention makes it possible to quickly optimize balance and molding cycle time to a degree not previously practical. In practicing the invention, there is a larger tolerance on preform mass which results in reduced preform costs.

The foregoing and other objects, features and advantages of the invention will be better understood from the following more detailed description and appended claims.

SHORT DESCRIPTION OF THE DRAWINGS

FIG. 21 shows a time/balance matrix for examples of operation; and

FIG. 22 shows time delay as a function of bottom parking gap for examples of operation.

DESCRIPTION OF THE PREFERRED EMBODIMENT

Figure 1:
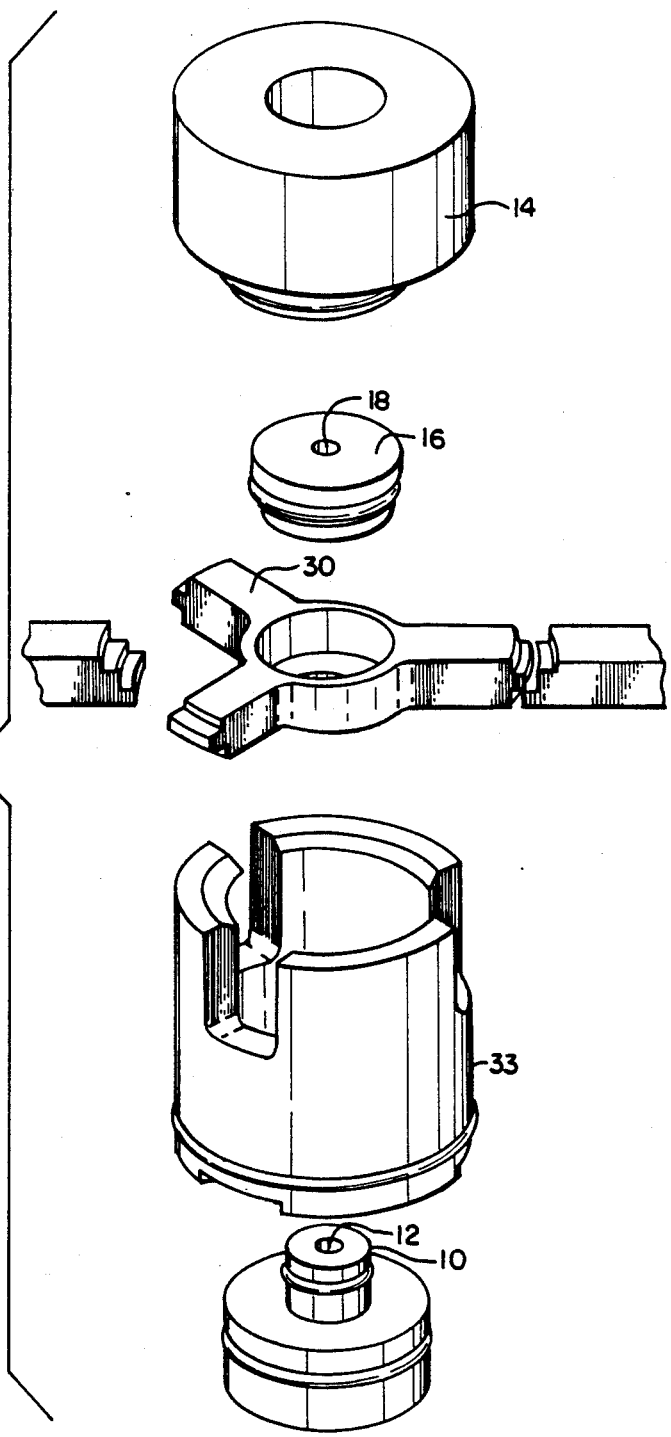
FIG. 1 is a partial exploded perspective view of the mold assembly.
Figure 2:
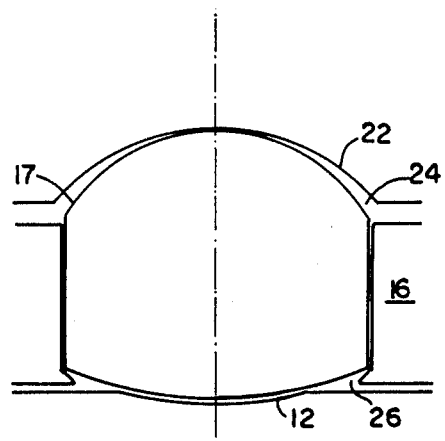
FIG. 2 depicts a preform between the molding surfaces.

FIG. 1 shows a mold assembly for molding glass optical elements. A first mold 10 (in this case the bottom mold) has a molding surface 12. A second, or top, mold 14 has an opposed molding surface 22 (FIG. 2). A containment sleeve 16 has a cavity 18 extending therethrough. The opposed molding surfaces of first and second molds 10 and 14 cooperate with the opposed open ends of cavity 18 to form an enclosed mold cavity of fixed volume when the molds 10 and 14 are closed. A glass preform to be molded is put into mold cavity 18 and the molds are moved together to press the glass into an optical element within the mold cavity.

As shown in FIG. 2, glass preform 17 is molded by the motion of the mold surfaces 12 and 22 which form the desired optical lens shape. The surface of the cavity in sleeve 16 is motionless. It forms the cylindrical side wall used for lens mounting.

Balanced molding of the lens means that the degree to which the glass of the preform fills the voids 24 and 26 between mold surfaces 12 and 22 is equivalent. This is typically measured by the radii between lens surface and the common side wall. In unbalanced molding, the lagging optical surface has a larger radius. The radius of curvature of each end of the preform should not be greater than the radius of curvature of the molding surfaces 12 and 22 to achieve balanced molding. However, this is not always possible, because other constraints apply.

For example, if the preform radius is larger than the radius for the mold's lens cavity, then compression molding would not work because a gas pocket would be trapped in the center of the cavity. No usable lens would be molded.

Figure 3:
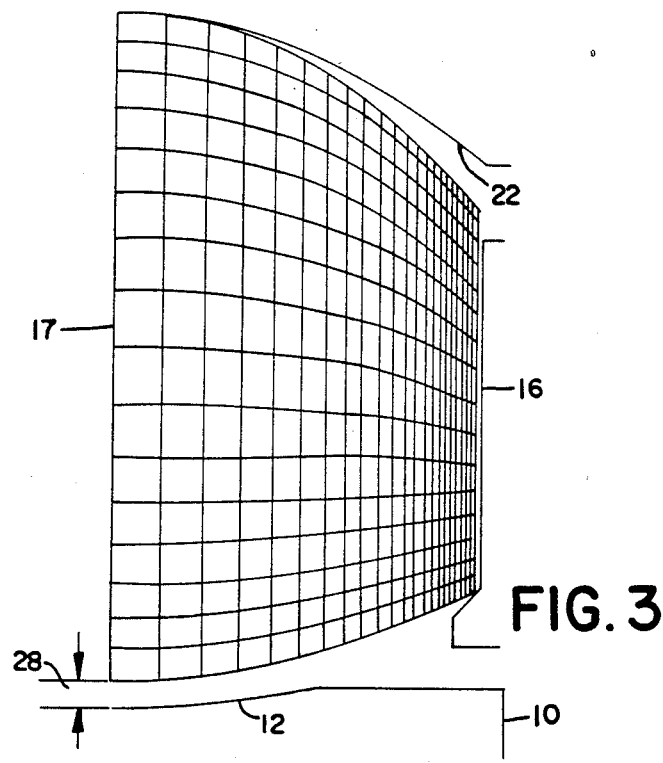
FIG. 3 depicts a flow model of a preform with the bottom mold surface in the parked position.

In accordance with present invention, balanced molding can be achieved even where the radii of curvatures of the preform would not normally result in balanced molding. As shown in FIG. 3, the closing travel of the surface 12 is parked leaving a gap 28. Then, a short period of molding by the molding surface 22 deforms the preform into a more balanced shape. The molding surface 22 of the second mold contacts the glass and continued movement of the second mold drives the glass toward contact with the molding surface 12 of the first mold. Thereafter, the first and the second molds are moved together until completion of the formation of both molded surfaces on the glass element. Alternatively, motion of both mold surfaces 12 and 22 can commence before the glass contacts surface 12. An advantage of this, is that it speeds up the molding process.

Adjusting the process for balanced flow is in large part speeding up the formation of the larger radius. This can be done by programming the mold motions, so that the remaining motion is between the side wall and the mold adjoining the larger radius. Speeding up the formation by programming motions is much faster than by changing preform radii, and it is more flexible.

Figure 4:
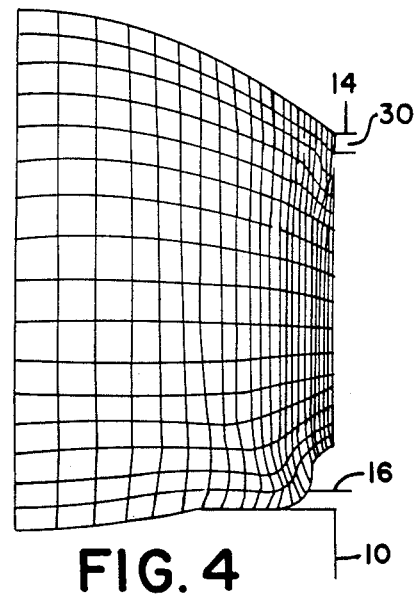
FIG. 4 depicts a flow model of an optical element produced when molding began with both mold surfaces in glass contact.

FIG. 4 is a flow model showing the final molded shape when molding began with both mold surfaces in glass contact. A fin 30 was formed at the top of the optical element. This is not acceptable because of the oversize on the cylindrical side wall and because of the tendency for such a shape to chip off small pieces of the edge of the lens.

Figure 5:
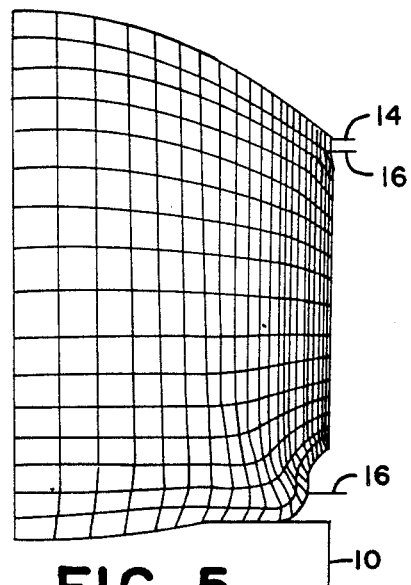
FIG. 5 depicts the same preform molded from the park position.

FIG. 5 depicts the final molding of the same preform but with delayed mold closing in accordance with the present invention. In this example, the bottom mold 10 was parked with the molding surface 12 at a position 0.005" below the preform for a period of 0.6 seconds, and then allowing the bottom surface motion to complete formation of a nicely balanced lens. The gap at which to park the bottom mold is determined by how much of the preform's cylindrical side wall extended above the surface of the cylindrical containment sleeve 16 when the glass made contact. Parking has driven the preform down into the sleeve so that no unsupported preform side wall remains to prematurely form a glass fin.

Figure 6:
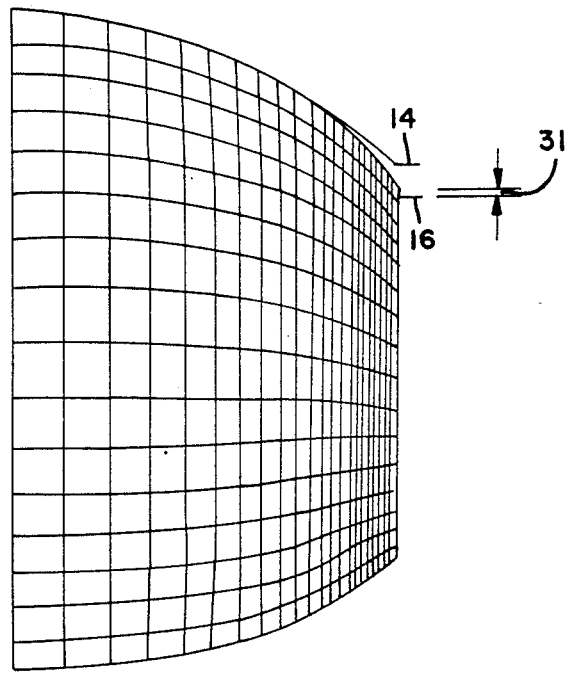
FIG. 6 shows a flow model with an unsupported preform side wall.

When the surface of the preform fixes itself against the surface 16, (FIG. 2) lock-up occurs. Beyond the time of lock up on the side wall, the top mold is making a non-spheric preform shape on any unsupported portion of the bottom preform surface. FIG. 6 shows the portion 31 of the preform's cylindrical side wall which extends above the surface of the containment sleeve when the glass made contact with the inner cylindrical surface of the containment sleeve.

Figure 7:
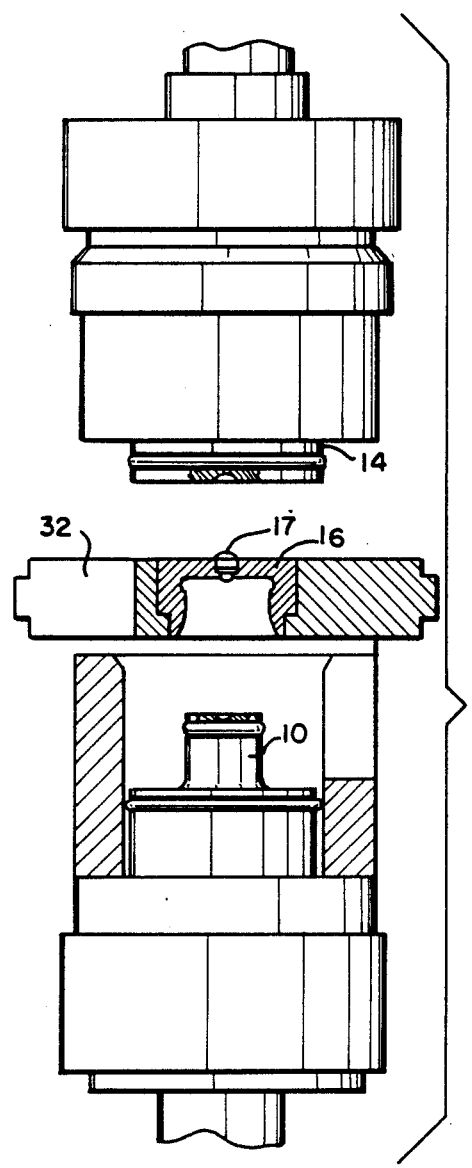
FIG. 7 shows the mold assemblies with both molds open.

FIGS. 7-11 show a sequence of operation of the mold assembly in accordance with the invention. In FIG. 7, first mold 10 and second mold 14 are open and a preform 17 of glass has been placed in the cavity of containment sleeve 16 which is carried by the spider 32. Preform 17 and the assembly in which it is carried, have been heated to the proper molding temperature.

Figure 8:
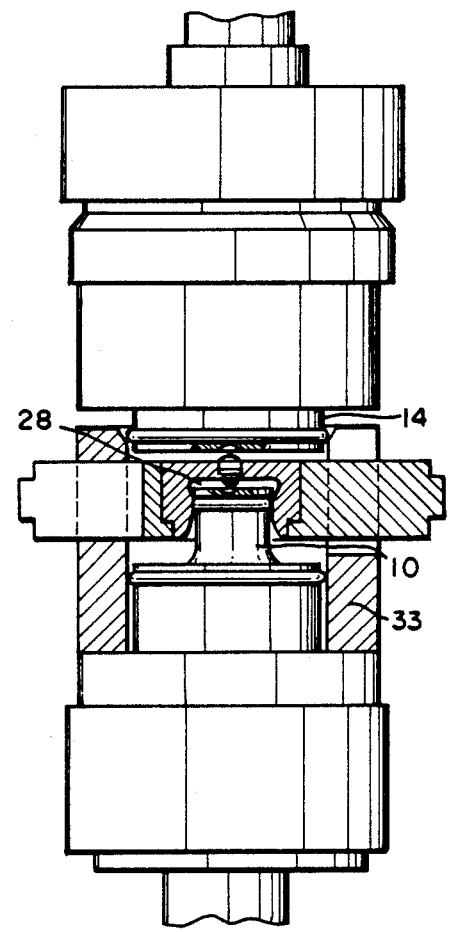
FIG. 8 shows the mold assembly with the bottom mold parked.

As shown in FIG. 8, the first mold 10 has been moved up and parked with a gap 28 between the molding surface 12 of mold 10 and the bottom surface of the preform 17. Upper mold 14 is moving downwardly and is not yet in contact with the preform.

Figures 9, 10:
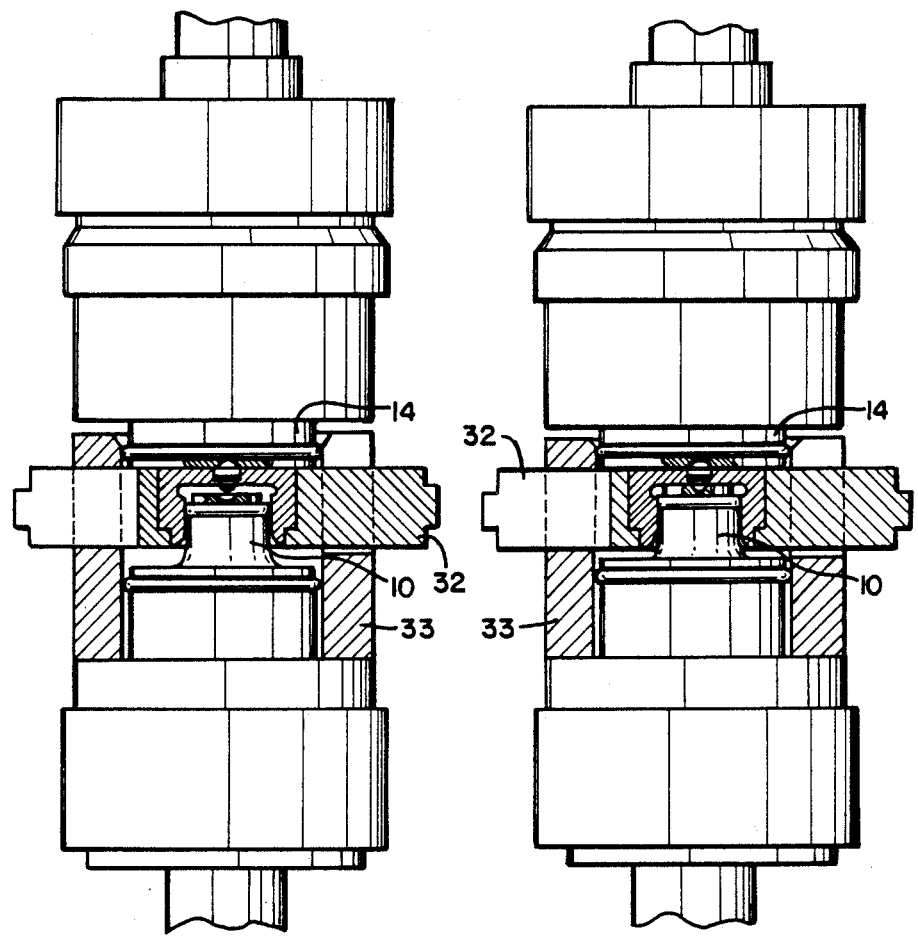
FIG. 9 shows the mold assembly after the top mold has moved into contact with the top surface of the preform.
FIG. 10 shows the top mold driving glass into contact with the mold surface of the bottom mold.

As shown in FIG. 9, the molding surface 22 of the top mold 14 is in contact with the top of the glass preform and is moving it downwardly. Both molds are within the inner cylindrical surface of sleeve 33.

In FIG. 10, the bottom surface of the preform is in contact with the molding surface 12 of first mold 10. The time delay has expired and the bottom mold 10 is now moving upwards at the same time the top mold 14 is completing its motion downward. The motion of the top surface before time delay changes the shape of the bottom surface of the preform so that continued molding of both surfaces will be balanced.

Figure 11:
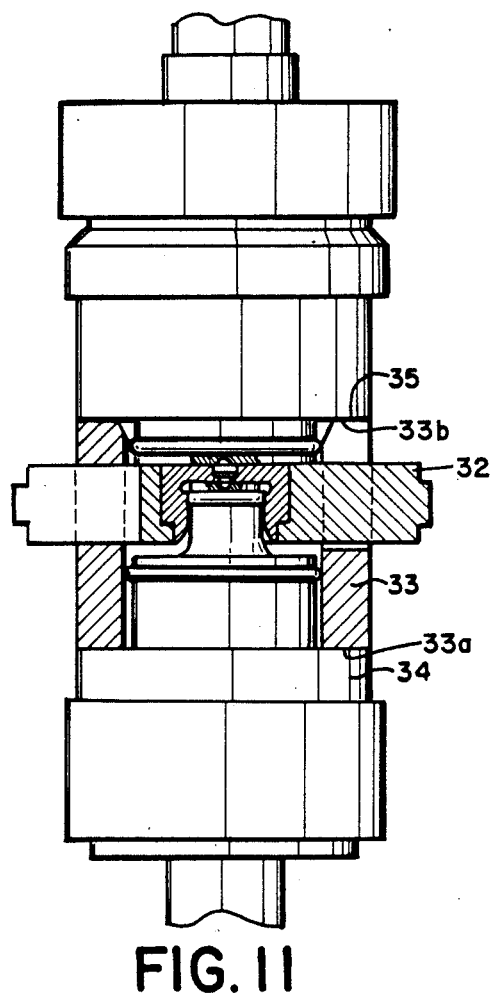
FIG. 11 shows the bottom mold moved upwardly to completion of formation of the glass.

FIG. 11 shows the completion of the balanced molding. A projection 34 of the first mold is in contact with alignment pads 33a on the, bottom surface of cylindrical sleeve 33. A projection 35 on the top mold has stopped against the alignment pads 33b on the top of the sleeve 33. The final desired shapes of the molded surfaces of the glass optical element have been completed.

EXAMPLES

FIGS. 12-16 show a series of computer-generated flow models which were run for two preform volumes and for three gaps. The computer-generated flow models correspond quite closely to the glass in actual practice of the invention.

The two volumes shown for each gap correspond to the maximum and minimum volumes allowable in the preform specification.

They are used to gauge the sensitivity of the molding model to normal expected variations in the volume of incoming preforms. Preform volume will be specified by a mass tolerance which directly translates into a volume variation.

The gaps are the distance 28 (FIG. 3) from the bottom of the preform 17 to the surface 12 of first mold 10 at the parking position. The gaps selected are 0.000, 0.005, and 0.010 inches. All flows ran to a total of 2.5 seconds (relative) with parking ending at 0.6 seconds (relative). Flow is modeled at a lower viscosity to speed up the time frame.

Figure 12:
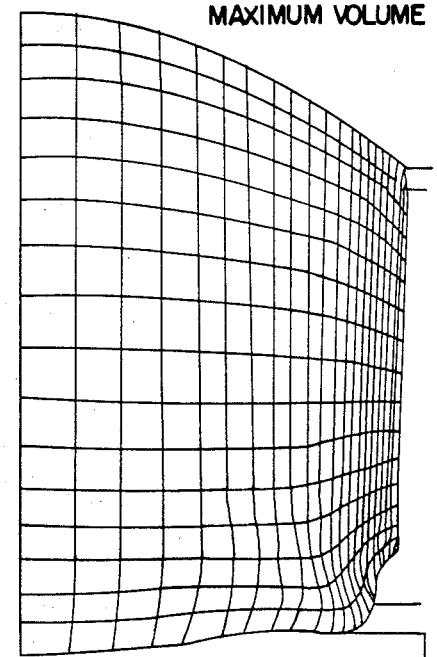
FIGS. 12-20 are flow models depicting examples of operation of the invention.
Figure 13:
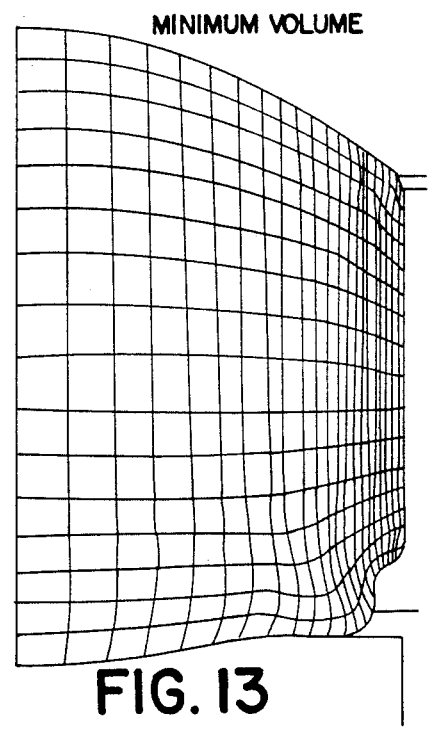
Figure 14:
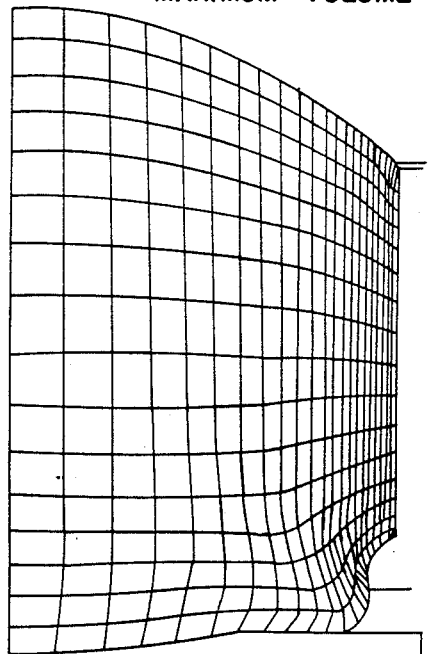
Figure 15:
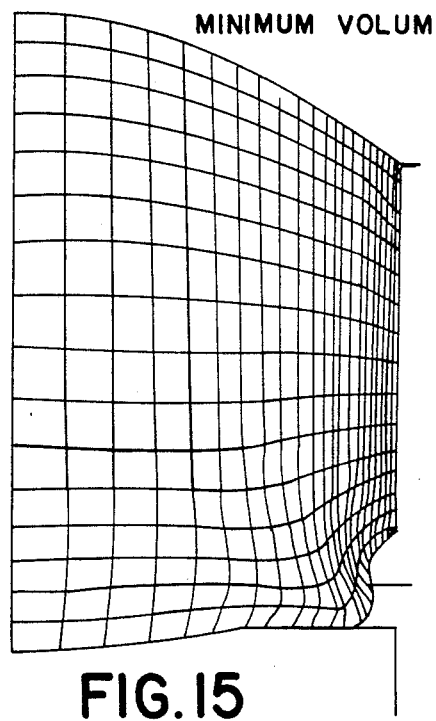
Figure 16:
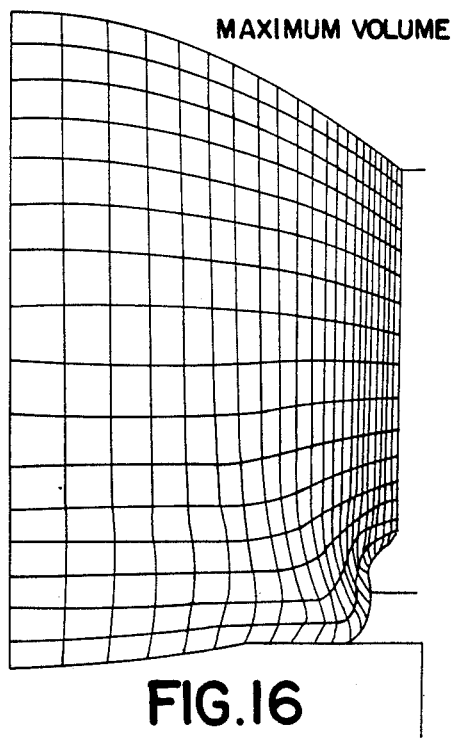
Figure 17:
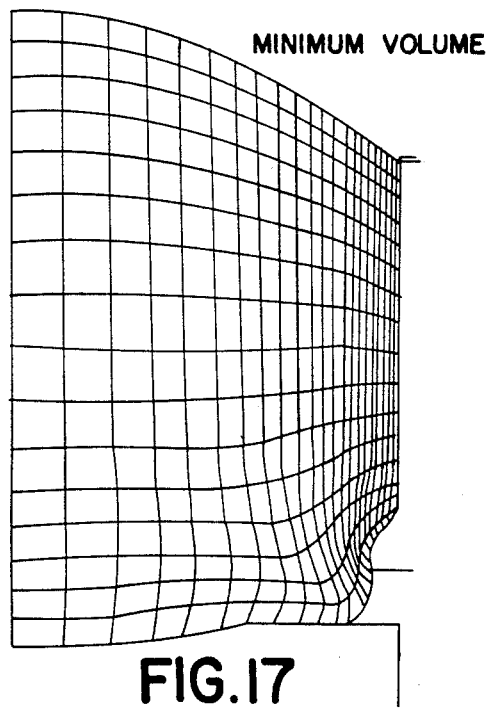

FIG. 12 shows the maximum volume and FIG. 13 shows the minimum volume for a gap of 0.000 inches. FIG. 14 shows the maximum volume and FIG. 15 shows the minimum volume for a gap of 0.005 inches. FIG. 16 shows the maximum volume and FIG. 17 shows the minimum volume for a gap of 0.01 inches.

Since virtually all of the optical surfaces are formed at the end of the parking time, the subsequent motion of the molding surface of first mold 10 forms the bottom lens flat. The motion of the surface relative to the stationary containment sleeve surface fills in the void faster than if the top molding surface motion were providing the molding action.

The optical elements of FIGS. 12-17 each have the molded shapes which are the maximum and the minimum volume cases. No significant effect in the volume variation was found. The model used does not halt the upper molding surface travel at the mold stop, so some variation is seen in this molding surface position. This is an artifact of the model and is not a real result of machine molding. The effect due to gap variation by contrast is significant. For either preform volume, the radius adjacent to the lower molding surface is more fully formed as the gap increases. For the gaps of 0.005 and 0.010 inches, a fin adjacent to surface 12 would be expected if molding were allowed to continue for the full time allowed. The speed of formation increases as gauged by the over flow being largest at 0.010 inches gap. The mold tooling of FIGS. 7-11 molds to a stop. As a result, the molds cannot continue to move past a hard set of stops. The over pressed results of FIGS. 14-15 do not occur when molding to a stop. These results predict that the lens will be formed faster, and that is the important result needed for more machine output.

Figure 18:
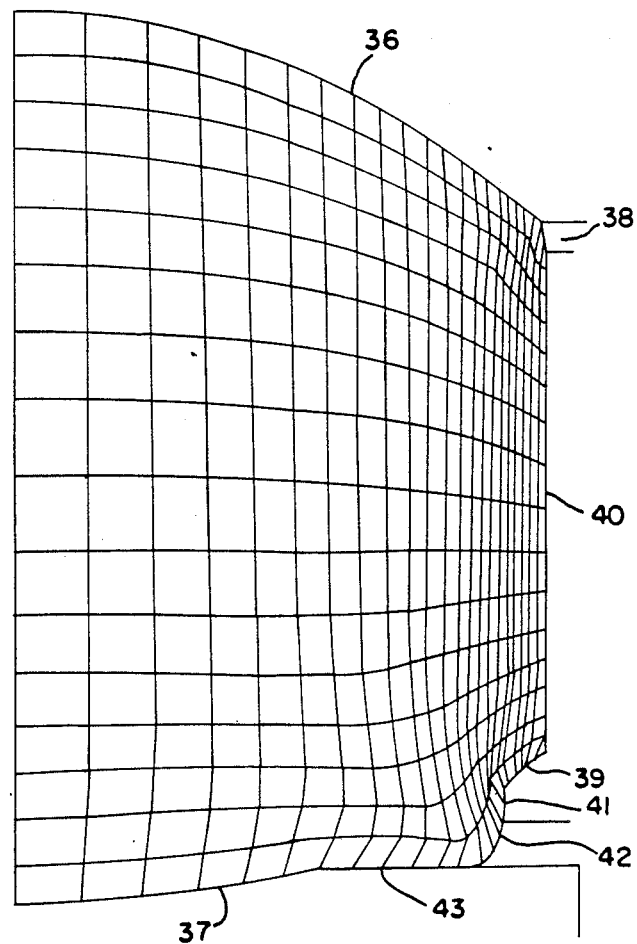
Figure 19:
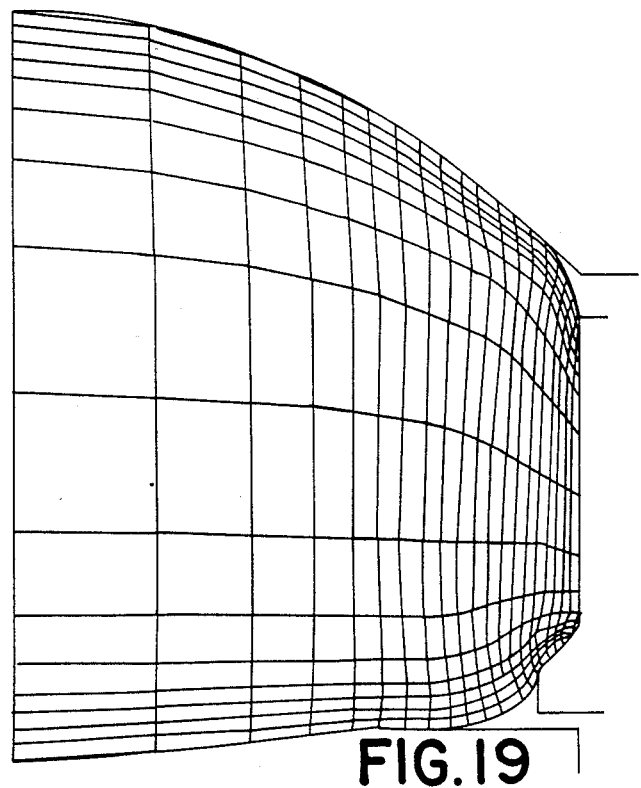
Figure 20:
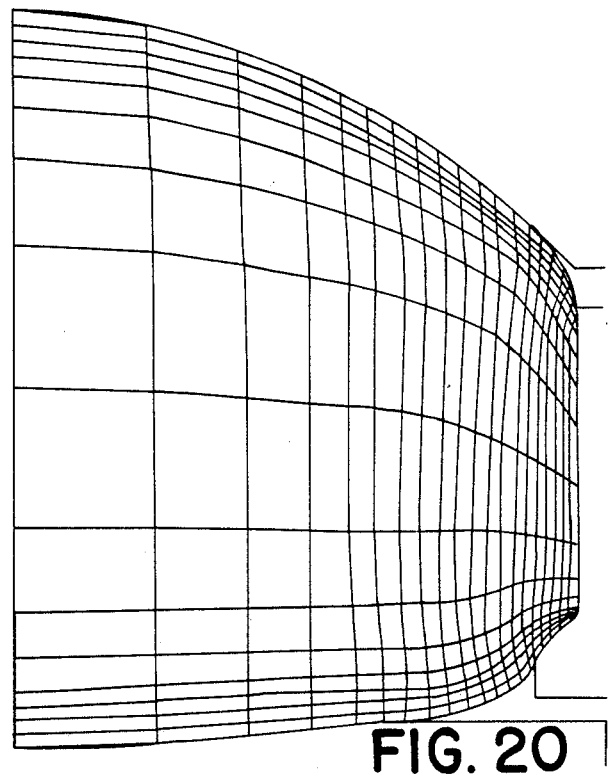

FIGS. 18-20 show flow models of optical elements formed in the mold-to-a-stop assembly of FIGS. 7-11.

FIG. 18 is a flow model of a lens which very closely duplicates an actual lens which was produced with the following conditions:
BOTTOM MOLD PARKING GAP 0.029 inches
PARKING TIME DELAY=40 seconds
The times used in actual molding are greater than given in the flow model because the flow model uses a lower vision than real molding to obtain a shortened time of calculation.

In both the actual lens and in the flow model of FIG. 18, the larger optical surface goes neatly into the straight side wall with no bulge or fin beyond the side wall diameter. The top blend 38 can be a troublesome problem in unbalanced molding because a sharp edged fin is quickly formed.

There are several features of a balanced lens that are important. The 45° taper 39 is fully formed, as is the side wall 40. There is some amount of straight side wall at the small diameter 41. From there the glass blends at 42 to the lower flat 43 in a free form shape that varied with the mass of the preform. The lower flat 43 bounds the second optical surface 37. Both optical surfaces 36 and 37 are fully formed. The top surface 36 has no adjoining flat to simply define that it is fully formed. A balanced lens is expected to have two fully formed optical surfaces; no fin at either blend; fully formed 45° taper; and a smoothly formed side wall.

If no bottom mold parking gap is used, then the flow model predicts an incompletely formed 45° taper, a minimal flat, and a possible fin at the top blend. A lens molded with no parking gap and a short 2 second time delay on the bottom mold movement showed an unbalanced shape as expected.

In addition to the above prediction of unbalanced molding, the flow model also indicates that the time to complete molding is a function of both time delay and parking gap. To investigate these two results more fully, two levels of time delay and four levels of parking gap were used in a short molding experiment. FIG. 21 summarizes the results for both the physical characteristics of balanced molding and the time to end of molding (EOM). The EOM time is taken when the molds reach their stops.

Two conclusions are drawn from FIG. 21:
(1) The lower part of the lens is incompletely formed when the parking gap is less than 0.018 inches.
(2) The molding time (as measured by EOM) is shorter for the 2 second delay than for the 4 second delay.

These results are general. The EOM value can vary by approximately on the order of 2 seconds. Preform mass variation is one source of this variability.

Other flow model results were obtained while designing a preform for another lens, shown in FIGS. 19 and 20. Flow modeling is the final step to selecting a preform shape.

The preform for the lenses of FIGS. 19 and 20 has the following curvatures:

Upper surface radius of curvature=2.8546 mm
Lower surface radius of curvature=9.9354 mm The flow model was manipulated to demonstrate that balanced molding of a lens is possible. FIG. 19 presents one such lens shape for this first version of a preform. A controlled closure motion was required.

The preform was evaluated for three levels of time delay and for two levels of parking gap. The summarized flow model results for speed of molding in FIG. 22 exactly parallel the experimental EOM results previously summarized in FIG. 21. In both figures, molding time decreases as you move towards shorter time delays and smaller gaps. Thus, the response surface implied experimentally is independently predicted by the flow model.

One further result underscores the value of controlled closure. Assume that the preform for the lenses of FIGS. 19 and 20 described above requires new tooling for preform manufacture. It would use 9.9354 mm radius of curvature tooling. But, assume that 9.5250 mm radius tooling is already available. A preform with the 9.5250 mm radius for the lower surface was flow modeled. FIG. 20 is a typical result from the flow conditions used. Controlled closure allowed easy acceptance of this change.

While a particular embodiment of the invention has been shown and described, various modifications are within the true spirit and scope of the invention. The appended claims are, therefore, intended to cover all such modifications.

What is claimed is:

1. A method of molding a glass optical element having first and second optical surfaces comprising:
   providing first and second molds having molding surfaces shaped for forming said first and second optical surfaces respectively disposed in an opposing operative relationship,
   providing a glass preform,
   providing a mounting means for said glass preform operatively associated with said first and second molds,
   disposing said glass preform in said mounting means between said molding surfaces in a non-contacting relationship with said molding surfaces,
   heating said preform and said first and second molds,
   moving said first mold in a direction toward said second mold and toward said glass preform to a position such that said molding surface of said first mold is short of a contact with said glass preform forming a gap with a void between said molding surface of said first mold and said glass preform,
   moving said second mold toward said glass preform so that its molding surface contacts a portion of said glass preform with a resulting adjacent void being provided between the molding surface of said second mold and the portion of said glass preform, which faces the second mold surface but does not contact it,
   thereafter moving at least one of said first and second molds toward the other mold whereby said molding surfaces of said molds contact said glass preform to shape said preform in a manner such that voids between the preform and each of said molding surfaces are filled completing formation of said first and second molded optical surfaces of said glass element, and
   controlling the movement of said molding surfaces to balance the formation of said optical surfaces of said optical element so that said glass fills said voids substantially equally with respect to each other to thereby provide balanced molding of said glass optical element.

2. The method of claim 1 wherein the movement of said second mold is continued to drive said glass into contact with the molding surface of said first mold and thereafter both of said first and second molds are moved together completing formation of both said molded optical surfaces.

3. The method of claim 1 wherein said glass preform has two curved surfaces and a cylindrical sidewall, and wherein said molding surface of said first mold lags in molding the curved surface it contacts relative to the molding of the curved surface contacted by said molding surface of said second mold.

4. The method of claim 3 wherein to dispose said glass preform in said mounting means, said glass preform is disposed in mounting means comprising a containment sleeve having a cavity extending therethrough, said molding surfaces of said first and second molds cooperating with opposed open ends of said cavity to form an enclosed mold cavity of fixed volume, and determining the gap between said position short of contact with said glass preform by the amount said cylindrical sidewall of said glass preform extends beyond said cavity of said containment sleeve when said preform makes contact with said second mold.

5. The method of claim 2 wherein said glass preform has two curved surfaces and a cylindrical sidewall, and wherein said molding surface of said first mold lags in molding a first curved surface it contacts relative to the molding of a second curved surface contacted by said molding surface of said second mold.

6. The method of claim 5 wherein the continued movement of said second mold drives said preform into contact with the molding surface of said first mold producing a shape that results in a balance molding with the second curved surface of said preform.

7. A method of molding a glass optical element having two optical surfaces comprising:
   providing first and second molds having opposed molding surfaces shaped for forming said two optical surfaces,
   providing a glass preform,
   providing a mounting means for mounting said glass preform in a non-contacting operative relationship with said opposed molding surfaces,
   moving said first and second molds toward one another,
   heating said preform and said first and second molds,
   moving said first mold toward said second mold and toward said glass preform to a position short of contact with said glass preform forming a gap with a void between said first mold and said preform,
   moving said second mold toward said glass preform so that its molding surface contacts a portion of said glass preform with a resulting adjacent void being provided between said second mold and the portion of said preform which faces the second mold surface but does not contact it,
   thereafter moving at least one of said first and second molds toward the other mold such that said molding surface of said first mold contacts said glass preform to shape said preform and fill the voids between the preform and said first and second molds completing formation of both molded optical surfaces on said glass element, and controlling and completing said movement of said molds for balanced formation of opposed optical surfaces on said optical element so that the glass fills said voids substantially equally with respect to each other to thereby provide balanced molding of said glass optical element.

8. The method of claim 7 wherein the movement of said second mold is continued to drive said glass into contact with the molding surface of said first mold and thereafter both of said first and second molds are moved together completing formation of both said molded optical surfaces.

9. The method of claim 7 wherein said glass preform has two curved surfaces and a cylindrical sidewall, and wherein said molding surface of said first mold lags in molding the curved surface it contacts relative to the molding of the curved surface contacted by said molding surface of said second mold.

10. The method of claim 8 wherein said glass preform has two curved surfaces and a cylindrical sidewall, and wherein said molding surface of said first mold lags in molding a first curved surface it contacts relative to the molding of a second curved surface contacted by said molding surface of said second mold.

11. The method of claim 8 wherein the continued movement of said second mold drives said preform into contact with the molding surface of said first mold producing a radius of curvature which allows balanced molding with the radius of curvature of the second curved surface of said preform.

12. The method of claim 9 wherein said preform is disposed in a containment sleeve having a cavity extending therethrough and wherein said molding surfaces of said first and second molds cooperate with opposed open ends of said cavity to form an enclosed mold cavity of fixed volume.

13. The method of claim 12 wherein said gap between said position short of contact with said glass preform is determined by the amount said cylindrical sidewall of said glass preform extends beyond said cavity of said containment sleeve when said preform makes contact with said second mold.

14. A method of molding a glass optical element having opposed molded surfaces comprising, providing a containment sleeve having a cavity extending therethrough, providing first and second molds having opposed molding surfaces shaped for forming said opposed molded surfaces of said optical element, the opposed molding surfaces of the molds being cooperable with opposed open ends of said containment sleeve to form an enclosed mold cavity of fixed volume, positioning and supporting a glass preform to be molded in said containment sleeve between and out of contact with said molding surfaces, heating said preform and said first and second molds, moving said molds toward each other and toward said glass preform so that one molding surface contacts a portion of one glass preform surface and forms an adjacent void between said one molding surface and the portion of the glass preform which does not contact the one molding surface, and the other molding surface is positioned with a predetermined gap between the opposite glass preform surface with a void between the other molding surface and said glass preform, moving said molds toward each other such that said other molding surface contacts said glass preform to shape said preform whereby voids between the preform and said first and second molds are filled and to press said glass preform into an optical element within said mold cavity, and controlling the movement of said molds to balance the complete formation of opposed molded surfaces on said glass optical element so that said glass fills the voids substantially equally with respect to each other to thereby provide balanced molding of said glass optical element.

15. The method of claim 14 wherein the moving of the molds includes the steps of:

moving said first mold to a position short of contact with said glass preform to form a gap with a void between the first mold and the glass preform, moving said second mold so that its molding surface contacts a portion of said glass preform with an adjacent void between the second mold and the glass preform, and thereafter moving at least one of said first and second molds toward the other completing formation of both said molded optical surfaces.

16. The method of claim 15 wherein the movement of said second mold is continued to drive said glass into contact with the molding surface of said first mold and thereafter both of said first and second molds are moved together completing formation of both said molded optical surfaces.

17. The method of claim 14 wherein said glass preform has two curved surfaces and a cylindrical sidewall, and wherein said molding surface of said first mold lags in molding a first curved surface it contacts relative to the molding of a second curved surface contacted by said molding surface of said second mold.

18. The method of claim 17 wherein the continued movement of said second mold drives said preform into contact with the molding surface of said first mold producing a radius of curvature which allows balanced molding with the radius of curvature of the second curved surface of said preform.

19. The method of claim 17 wherein said gap between said position short of contact with said glass preform is determined by the amount said cylindrical sidewall of said glass preform extends beyond said cavity of said containment sleeve when said preform makes contact with said second mold.

* * * * *